(12) United States Patent
Chun et al.

(10) Patent No.: US 9,025,510 B2
(45) Date of Patent: May 5, 2015

(54) METHOD FOR ELIMINATING INTERFERENCE IN MULTI-NODE SYSTEM AND TERMINAL USING METHOD THEREOF

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 13/806,994

(22) PCT Filed: Jun. 28, 2011

(86) PCT No.: PCT/KR2011/004722
§ 371 (c)(1),
(2), (4) Date: Dec. 26, 2012

(87) PCT Pub. No.: WO2012/002711
PCT Pub. Date: Jan. 5, 2012

(65) Prior Publication Data
US 2013/0100875 A1 Apr. 25, 2013

Related U.S. Application Data

(60) Provisional application No. 61/358,947, filed on Jun. 28, 2010, provisional application No. 61/358,945, filed on Jun. 28, 2010.

(51) Int. Cl.
*H04J 3/00* (2006.01)
*H04B 7/02* (2006.01)
*H04W 4/00* (2009.01)
*H04B 7/04* (2006.01)
*H04B 15/00* (2006.01)
*H04L 25/03* (2006.01)
*H04W 72/00* (2009.01)
*H04W 88/02* (2009.01)

(52) U.S. Cl.
CPC ............ *H04W 72/005* (2013.01); *H04B 7/024* (2013.01); *H04B 7/04* (2013.01); *H04B 7/0456* (2013.01); *H04B 15/00* (2013.01); *H04L 25/03904* (2013.01); *H04W 88/02* (2013.01)

(58) Field of Classification Search
USPC .......... 370/252–312, 328–345; 375/219–260, 375/265–299; 455/501–509, 452
See application file for complete search history.

(56) References Cited

U.S. PATENT DOCUMENTS

2010/0034146 A1 2/2010 Hou et al.

FOREIGN PATENT DOCUMENTS

| KR | 10-2009-0026101 | 3/2009 |
| KR | 10-2009-0031082 | 3/2009 |
| KR | 10-2010-0060958 | 6/2010 |

*Primary Examiner* — Man Phan
(74) *Attorney, Agent, or Firm* — Lee, Hong, Degerman, Kang & Waimey

(57) ABSTRACT

An interference elimination method performed by a first terminal in a multi-node system and an apparatus for the same are provided. The method includes receiving information from a node related to a second precoding matrix that is applied to a second signal to be transmitted to a second terminal; receiving a first signal to which a first precoding matrix is applied from the node; and eliminating an interference signal contained in the first signal based on the information on related to the second precoding matrix.

6 Claims, 7 Drawing Sheets

METHOD FOR ELIMINATING INTERFERENCE IN MULTI-NODE SYSTEM AND TERMINAL USING METHOD THEREOF

CROSS-REFERENCE TO RELATED APPLICATIONS

This application is the National Stage filing under 35 U.S.C. 371 of International Application No. PCT/KR2011/004722, filed on Jun. 28, 2011, which claims the benefit of U.S. Provisional Application Ser. No. 61/358,947, filed on Jun. 28, 2010, and U.S. Provisional Application Ser. No. 61/358,945, filed on Jun. 28, 2010, the contents of which are all hereby incorporated by reference herein in their entirety.

TECHNICAL FIELD

The present invention relates to wireless communication and, more particularly, to a method of removing interference in a multi-node system and user equipment using the method.

BACKGROUND ART

The data transfer rate of a wireless communication network is recently increasing rapidly. This is because a variety of devices, such as smart phones and tablet PCs which require Machine-to-Machine (M2M) communication and a high data transfer rate, are appearing and spread. In order to satisfy the required high data transfer rate, carrier aggregation technology efficiently using larger frequency bands, cognitive radio technology, etc. and multi-antenna technology and multi-eNB cooperation technology, etc. in order to increase a data capacity within a limited frequency are recently emerging.

Furthermore, a wireless communication system is evolving into a multi-node system in which the density of accessible nodes near a user is increasing. A multi-node system may have higher system performance through cooperation between nodes. For example, if each node operates as an independent Base Station (BS), Advanced eNB (AeNB), Node-B (NB), eNode-B (eNB), or an Access Point (AP), the transmission and reception of the node are controlled by one control station, and thus the node operates likes an antenna (or antenna group) for one cell, a multi-node system can have more excellent system performance than that when nodes do not cooperate with each other. In this case, the multi-node system can be called a Distributed Antenna System (DAS).

Or a multi-node system may operate as a multi-cell system in which each node has an independent identifier (ID) and performs scheduling and handover. In a multi-cell system, if the coverages of nodes are configured to overlap with each other, this is called a multi-tier network.

There is a need for a method of removing interference that can be used in this multi-node system and user equipment using the method.

DISCLOSURE

Technical Problem

There is provided a method of removing interference in a multi-node system and user equipment using the method.

Technical Solution

A method of removing interference, performed by first User Equipment (UE), in a multi-node system according to an aspect of the present invention includes the steps of receiving, from a node, information on a second precoding matrix applied to a second signal transmitted to second UE; receiving, from the node, a first signal to which a first precoding matrix has been applied; and removing an interference signal included in the first signal based on the information on the second precoding matrix.

The interference signal may be the product of the second signal to which the second precoding matrix has been applied and a channel matrix between the node and the first UE.

The information on the second precoding matrix may include a precoding row vector for a transmit antenna, exerting interference on the first UE, in the second precoding matrix applied to the second signal by the node.

A method of removing interference, performed by first User Equipment (UE), in a multi-node system according to another aspect of the present invention includes the steps of receiving, from a node, a first signal to which a first precoding matrix has been applied and removing an interference signal included in the first signal, wherein the interference signal includes a second signal for second UE to which a second precoding matrix has been applied, and a precoding row vector for an transmit antenna of the node that sends a signal, exerting interference on the first UE, in the second precoding matrix includes a predefined and fixed value.

The first UE may obtain a reception filter that minimizes the interference signal using precoding row vectors including the predefined and fixed value.

The method may further include the steps of obtaining a precoding matrix that maximizes the first signal based on the reception filter and a channel matrix between the node and the first UE and feeding the precoding matrix that maximizes the first signal back to the node.

A method of removing interference, performed by first User Equipment (UE), in a multi-node system according to yet another aspect of the present invention includes the steps of receiving antenna configuration information from a Base Station (BS); receiving a first signal from at least one node controlled by the BS; and removing an interference signal from the first signal, wherein the interference signal includes a second signal transmitted from the at least one node to second UE by applying a second precoding matrix to the second signal, and the antenna configuration information includes information indicative of transmit antennas configured so that a number of receive antennas of the first UE is greater than a number of transmit antennas that send signals exerting interference on the first UE.

The antenna configuration information may include information on an antenna index, frequency band, or time for a transmit antenna that does not send a signal, from among the transmit antennas that send signals exerting interference on the first UE.

The antenna configuration information may be broadcast.

The step of removing the interference signal may be performed by applying a matrix in which an absolute value is a minimum, when multiplying the matrix by a channel matrix between the first UE and the at least one node, as a reception filter for the first signal.

The method may further include the steps of obtaining a precoding matrix that maximizes the first signal based on the reception filter and the channel matrix between the at least one node and the first UE and feeding the precoding matrix that maximizes the first signal back to the BS.

User equipment according to further yet another aspect of the present invention includes a Radio Frequency (RF) unit transmitting and receiving radio signals and a processor connected with the RF unit, wherein the processor receives antenna configuration information from a Base Station (BS), receives a first signal from at least one node controlled by the BS, and removing an interference signal from the first signal, the interference signal comprises a second signal transmitted from the at least one node to second UE by applying a second precoding matrix to the second signal, and the antenna configuration information includes information indicative of transmit antennas configured so that a number of receive antennas of the first UE is greater than a number of transmit antennas that send signals exerting interference on the first UE.

Advantageous Effects

In a multi-node system, an interference signal that acts on user equipment can be effectively removed. Accordingly, the quality of communication can be improved, and reliable communication is possible.

MODE FOR INVENTION

The following technology can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using Evolved-UMTS Terrestrial Radio Access (E-UTRA), and 3GPP LTE adopts OFDMA in downlink and adopts SC-FDMA in uplink. LTE-Advance (LTE-A) is the evolution of LTE.

Figure 1:
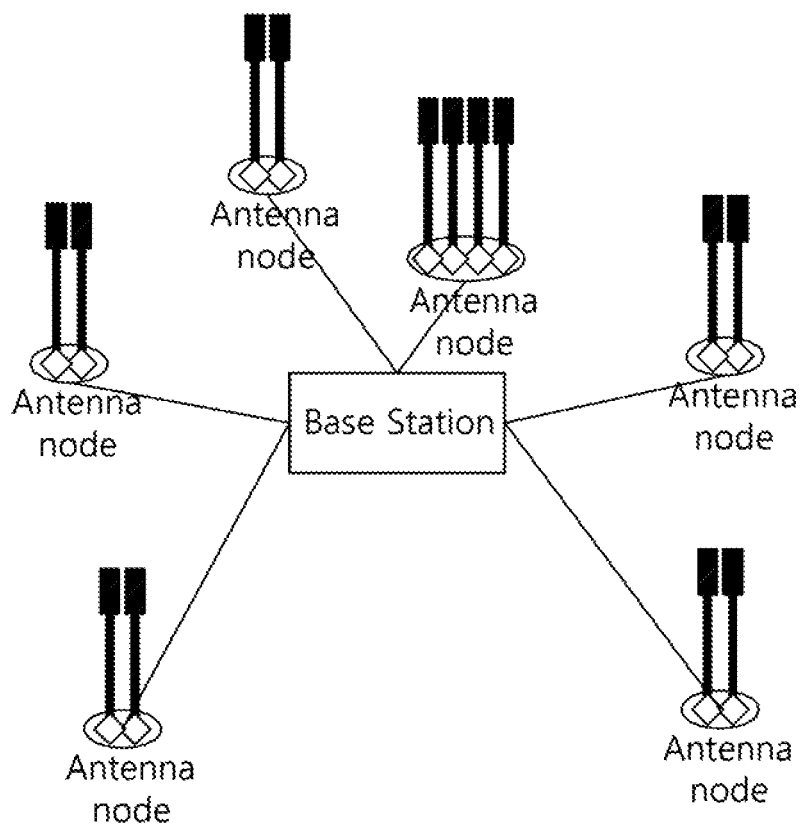
FIG. 1 shows an example of a multi-node system.

FIG. 1 shows an example of a multi-node system.

Referring to FIG. 1, the multi-node system includes an eNB and a plurality of nodes.

In FIG. 1, the nodes indicated by antenna nodes may be antennas or an antenna group that are distributed and disposed within a cell, but not limited thereto. That is, the node may be a macro eNB, a pico PeNB (PeNB), a home eNB (HeNB), a Remote Radio Head (RRH), a Remote Radio Unit (RRU), a relay or the like. The node is also called a point.

In a multi-node system, the transmission and reception of each node are managed by one eNB controller, and thus the node can operate like part of one cell. In this case, the multi-node system can be seen as a Distributed Antenna System (DAS) that forms one cell. In the DAS, nodes are disposed so that they are spaced apart from one another unlike in a case where the antennas of an eNB are disposed at the center of a cell in a conventional Centralized Antenna System (CAS).

In a multi-node system, if nodes have respective IDs and perform scheduling and the handover, this can be seen as a multi-cell (e.g., macro cell/femto cell/pico cell) system. In this multi-cell system, if the coverages of nodes are configured to overlap with each other, this is called a multi-tier network.

Figure 2:
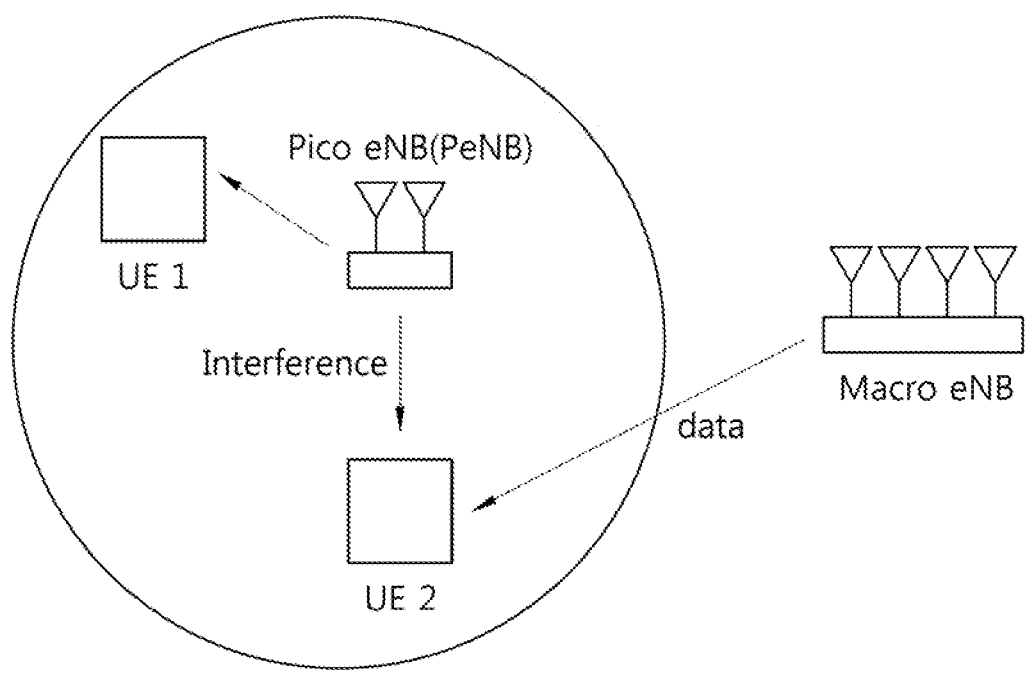
FIG. 2 shows a multi-node system, for example, a multi-tier network.

FIG. 2 shows a multi-node system, for example, a multi-tier network.

Referring to FIG. 2, the multi-tier network can have a form in which the coverages of a macro eNB and a pico cell eNB (PeNB) overlap with each other. Here, the macro eNB and the PeNB can use their own IDs.

The PeNB distinguishes a registered user ad a non-registered user from each other and can allow only a registered user to access thereto. If only a registered user is permitted to access the PeNB, the PeNB is called a Closed Subscriber Group (CSG) PeNB. If common users are permitted to access the PeNB, the PeNB is called an Open Subscriber Group (OSG) PeNB. The two methods may be mixed and operated.

If a PeNB operates in the CSG method, UE not UE registered with the PeNB can experience strong interference. For example, if UE 2 communicating with a macro eNB is UE not registered with a PeNB and the UE 2 moves to the coverage of the PeNB, a signal transmitted by the PeNB exerts strong interference on the UE 2.

Figure 3:
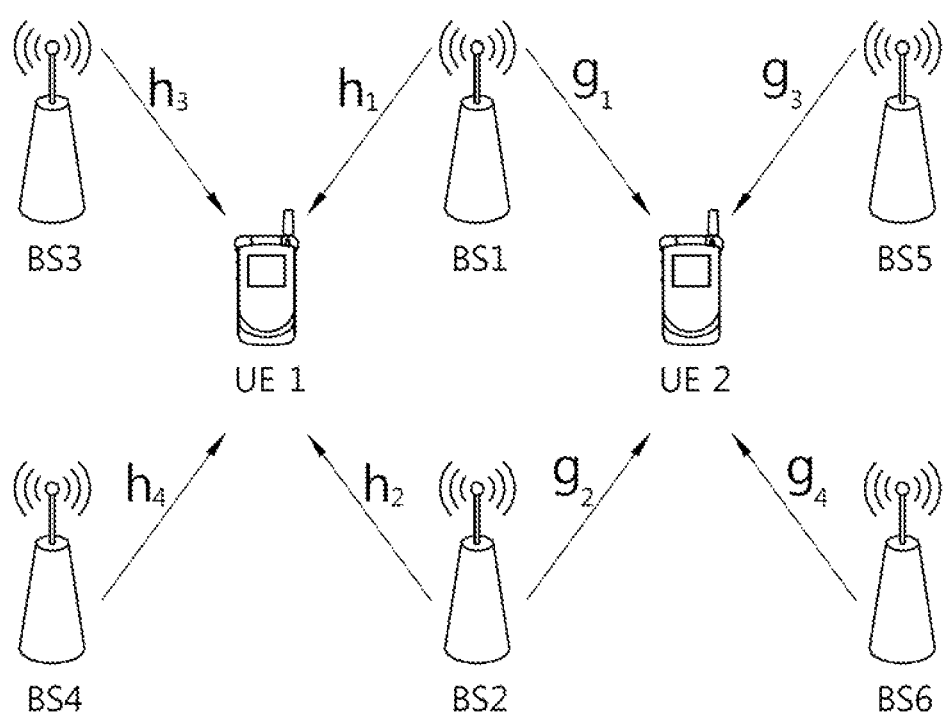
FIG. 3 shows an example of inter-cell interference in a multi-node system.

FIG. 3 shows an example of inter-cell interference in a multi-node system.

Referring to FIG. 3, UE 1 can receive signals from eNBs 1, 2, 3, and 4, and the UE 2 can receive signals from eNBs 1, 2, 5, and 6. Here, the eNBs 3 and 4 are sufficiently spaced apart from the UE 2, and thus the signals transmitted to the UE 1 may not exert interference on the UE 2. Furthermore, the eNBs 5 and 6 are sufficiently spaced apart from the UE 1, and thus the signals transmitted to the UE 2 may not exert interference on the UE 1. The eNBs 1 and 2 can multiplex the signal for the UE 1 and the signal for the UE 2 within the same radio resource region and send the multiplexed signal. The same radio resource region means a resource region on the time frequency that is formed of the same frequency band and time interval. In this case, the UE 1 may experience interference due to the signals transmitted from the eNBs 1 and 2 to the UE 2. Furthermore, the UE 2 may experience interference due to the signals transmitted from the eNBs 1 and 2 to the UE 1.

In order to solve this interference problem, a variety of methods are being discussed in standards, such as LTE-A and IEEE 802.16m. A method that is strongly taken into consideration is to divide radio resources that can be used by cells so that different cells use different radio resources. For example, each cell uses a different frequency, time, or code using Frequency Division Multiplexing (FDM), Time Division Multiplexing (TDM), Code Division Multiplexing (CDM), etc. Or, a method of avoiding inter-cell interference through downlink power control is also taken into consideration. However, the methods are to limit resources that can be used by cells and are disadvantageous in low system efficiency, a scheduling limit, etc.

Accordingly, there is a need for a more effective method of removing interference for UE which experiences interference when receiving signals from a plurality of eNB (or distributed antennas).

First, in a multi-node system, interference experienced by UE is described mathematically.

It is assumed that the case of FIG. 3 is commonly extended and thus $B_1$ eNBs are present near the UE 1 and $B_2$ eNBs are present near the UE 2. It is assumed that the total number of transmit antennas through which the $B_1$ eNBs send data to the UE 1 is $N^{Tx1}$ ($>=B_1$) and $N^{Tx1\_INT}$ ($<=N^{Tx1}$) transmit antennas from among the $N^{Tx1}$ transmit antennas send signal signals to another UE not the UE 1, for example, the UE 2 within the same radio resource region. Then, the signals transmitted from the $N^{Tx1\_INT}$ transmit antennas to the UE 2 can function as interference signals to the UE 1.

It is also assumed that the total number of transmit antennas through which the $B_2$ eNBs send data to the UE 2 is $N^{Tx2}$ ($>=B_2$) and $N^{Tx2\_INT}$ ($<=N^{Tx2}$) transmit antennas from among the $N^{Tx2}$ transmit antennas also send signals to another UE not the UE 2, for example, the UE 1 within the same radio resource region. Then, the signals transmitted from the $N^{Tx2\_INT}$ transmit antennas to the UE 1 can function as interference signals to the UE 2.

If the number of receive antennas of the UE 1 is $N^{Rx1}$, a reception signal $r_1$ received by the UE 1 is given as in the following equation.

$$r_1 = HWs + I_1 + n_1 \quad \text{[Equation 1]}$$

In Equation 1, H is a channel matrix between the UE 1 and the transmit antennas of the $B_1$ eNBs and can be represented by $H=[h_1\ h_2\ \ldots\ h_N Tz1]$.

Here, H may be a matrix having an $N^{Rx1} \times N^{Tx1}$ size. W is a precoding matrix having a precoding row vector as an element. W can be represented as in the following equation.

$$W = \begin{bmatrix} w_1 \\ w_2 \\ \ldots \\ w_{N^{T \times 1}} \end{bmatrix} \quad \text{[Equation 2]}$$

In Equation 2, W may be a matrix having an $N^{Tx1} \times N^{r1}$ size.

Furthermore, in Equation 1, s is a transmission data value, and s may be a vector having an $N^{r1} \times 1$ size. Here, $N^{r1}$ is the number of independent data streams transmitted to the UE 1, that is, the number of transmission ranks. $I_1$ is an interference signal, and $n_1$ is a noise signal.

Assuming that the number of receive antennas of the UE 2 is $N^{Rx2}$, a reception signal $r_2$ received by the UE 2 can be represented as in the following equation.

$$r_2 = GVx + I_2 + n_2 \quad \text{[Equation 3]}$$

In Equation 3, G is a channel matrix between the UE 2 and the transmit antennas of the $B_2$ eNBs and can be indicated by $G=[g_1\ g_2\ \ldots\ g_N Tx2]$. Here, G may be a matrix having an $N^{Rx2} \times N^{Tx2}$ size. V is a precoding matrix having a precoding row vector as an element. V can be represented as in the following equation.

$$V = \begin{bmatrix} v_1 \\ v_2 \\ \ldots \\ v_{N^{T \times 2}} \end{bmatrix} \quad \text{[Equation 4]}$$

In Equation 4, V may be a matrix having an $N^{Tx2} \times N^{r2}$ size.

Furthermore, in Equation 4, x may be a vector having an $N^{r2} \times 1$ size as a transmission data value. Here, $N^{r2}$ is the number of independent data streams transmitted to the UE 2, that is, the number of transmission ranks. $I_2$ is an interference signal, and $n_2$ is a noise signal.

If mutual signals exert interference on the UE 1 and the UE 2, $I_1$ in Equation 1 can be represented as in the following equation.

$$I_1 = [h_1\ \ldots\ h_{N^{T \times 1\_INT}}] \begin{bmatrix} v_1 \\ \ldots \\ v_{N^{T \times 1\_INT}} \end{bmatrix} x \quad \text{[Equation 5]}$$

That is, a result obtained by multiplying the signals, transmitted from the $N^{Tx1\_INT}$ transmit antennas to the UE 2 by applying precoding to the signals, by the channel matrix between the UE 1 and the $N^{Tx1\_INT}$ transmit antennas becomes an interference signal for the UE 1. Referring to Equation 5, in order for the UE1 to remove interference, a reception filter $C_1$ satisfying the following equation has only to be calculated and applied.

$$A = C_1 [h_1\ \ldots\ h_{N^{T \times 1\_INT}}] \begin{bmatrix} v_1 \\ \ldots \\ v_{N^{T \times 1\_INT}} \end{bmatrix} = 0 \text{ or } \min|A| \quad \text{[Equation 6]}$$

That is, the UE 1 can remove or minimize the interference signal $I_1$ by applying a proper reception filter $C_1$.

Furthermore, in Equation 3, $I_2$ can be represented as in the following equation.

$$I_2 = [g_1\ \ldots\ g_{N^{T \times 2\_INT}}] \begin{bmatrix} w_1 \\ \ldots \\ w_{N^{T \times 2\_INT}} \end{bmatrix} s \quad \text{[Equation 7]}$$

That is, a result obtained by multiplying the signals from the $N^{Tx2\_INT}$ transmit antennas transmitted to the UE 1 by applying precoding to the signals, by the channel matrix between the UE 2 and the $N^{Tx2\_INT}$ transmit antennas becomes an interference signal in the UE 2. Referring to Equation 7, in order for the UE 2 to remove interference, a reception filter $C_1$ satisfying the following equation has only to be calculated and applied.

$$B = C_2 [g_1\ \ldots\ g_{N^{T \times 2\_INT}}] \begin{bmatrix} w_1 \\ \ldots \\ w_{N^{T \times 2\_INT}} \end{bmatrix} = 0 \text{ or } \min|B| \quad \text{[Equation 8]}$$

That is, the UE 2 can remove or minimize the interference signal $I_2$ by applying a proper reception filter $C_2$.

However, in order for the UE 1 to calculate the reception filter $C_1$ as in Equation 6, the UE 1 have to know H and $[v_1 \, v_2 \ldots v_N Tx1\_INT]^T$. Furthermore, in order for the UE 2 to calculate $C_2$ as in Equation 8, the UE 2 have to know G and $[w_1 \, w_2 \ldots w_N Tx2\_INT]^T$.

The UE 1 can estimate H through a reference signal, but cannot estimate $[v_1 \, v_2 \ldots v_N Tx1\_INT]^T$. The UE 2 can estimate G through a reference signal, but cannot estimate $[w_1 \, w_2 \ldots w_N Tx2\_INT]^T$. Accordingly, there is a problem in that the reception filters $C_1$ and $C_2$ cannot be calculated.

In the present invention, in order to solve the problem, an eNB or a network can provide $[v_1 \, v_2 \ldots v_N Tx3\_INT]^T$ and/or $[w_1 \, w_2 \ldots w_N Tx2\_INT]^T$ to UE. The value may be fed back from counterpart UE to the eNB or the network. Or, $[v_1 \, v_2 \ldots v_N Tx1\_INT]^T$ and/or $[w_1 \, w_2 \ldots w_n Tx2\_INT]^T$ may have been predefined by the eNB or the network. This is described in detail below. In the following description, reference may be made to the above-described mathematical models. If the symbols used in the mathematical models are used in the following description, the symbols have the same means in the mathematical models.

Embodiment 1

Figure 4:
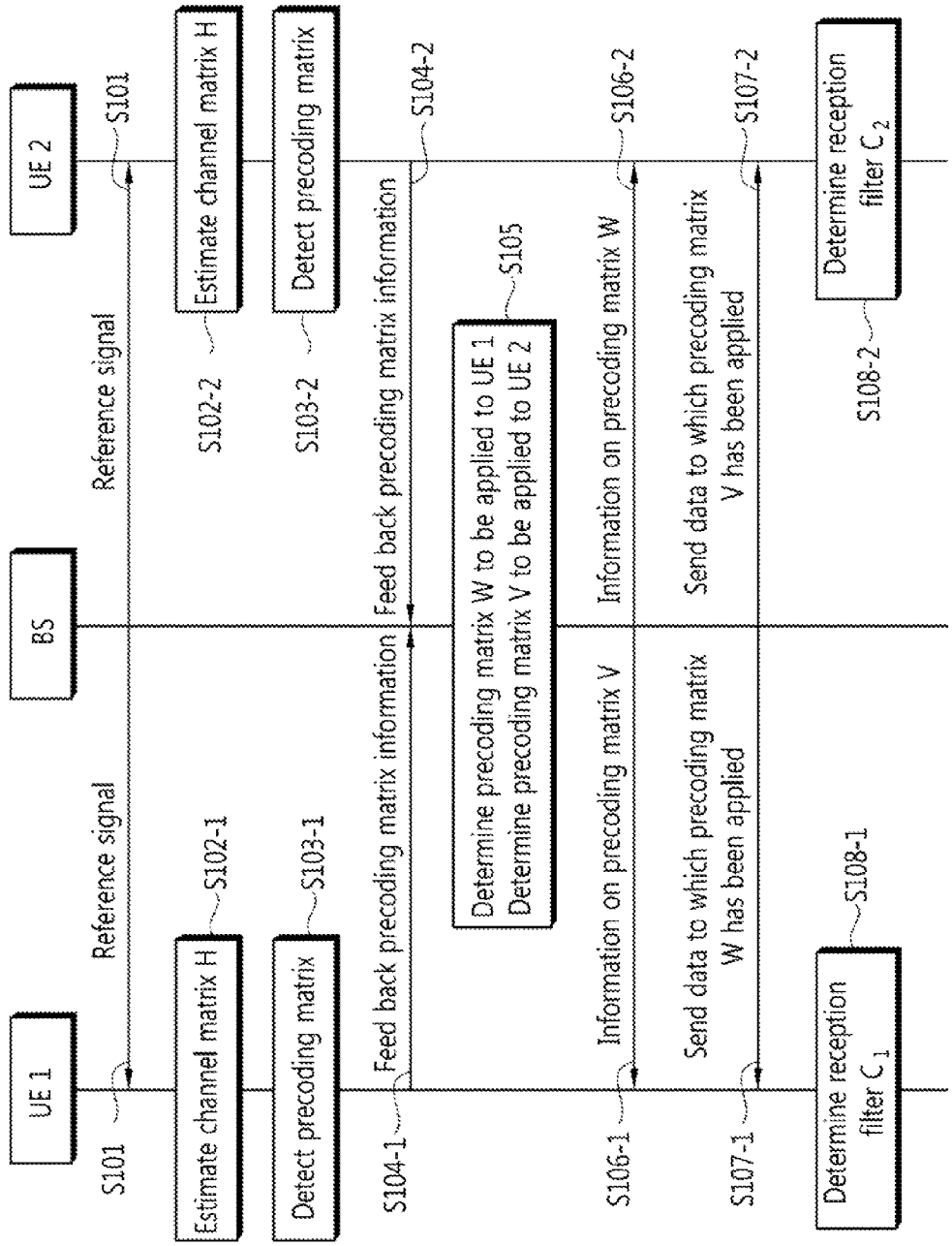
FIG. 4 shows a method of UE removing interference in accordance with an embodiment of the present invention.

FIG. 4 shows a method of UE removing interference in accordance with an embodiment of the present invention.

Referring to FIG. 4, a BS sends a reference signal to UE 1 and UE 2 (S101). The reference signal is a signal already known to the BS and the UE and is a signal used to measure a channel. The reference signal may also be called another terminology, such as a midamble or a pilot.

The UE 1 estimates a channel matrix H with the BS using the reference signal (S102-1). The UE 1 detects a preferred precoding matrix using the estimated channel matrix H as a premise (S103-1). The UE 1 feeds precoding matrix information indicative of the detected precoding matrix back to the BS (S104-1).

Likewise, the UE 2 estimates a channel matrix G with the BS using the reference signal (S102-2). The UE 2 detects a preferred precoding matrix using the estimated channel matrix G as a premise (S103-2) and feeds precoding matrix information back to the BS (S104-2).

The BS determines a precoding matrix W to be applied to the UE 1 and a precoding matrix V to be applied to the UE 2 (S105). The precoding matrix W may be the same as or different from the precoding matrix indicated by the precoding matrix information fed back by the UE 1. Likewise, the precoding matrix V may be the same as or different from the precoding matrix indicated by the precoding matrix information fed back by the UE 2.

The BS sends information on the precoding matrix V to the UE 1 (S106-1) and sends information on the precoding matrix W to the UE 2 (S106-2). That is, the BS provides each UE with information on a precoding matrix that is applied to different UE that functions as interference. For example, the BS may inform the UE 1 of $[v_1 \, v_2 \ldots v_N Tz2\_INT]^T$ and inform the UE 2 of $[w_1 \, w_2 \ldots w_N Tz2\_INT]^T$.

Next, the BS sends, to the UE 1, data to which the precoding matrix W has been applied (S107-1) and sends, to the UE 2, data to which the precoding matrix V has bee applied (S107-2).

The UE 1 can determine a reception filter $C_1$ in accordance with Equation 6, and the UE 2 can determine a reception filter $C_2$ in accordance with Equation 8.

As described above, the BS informs UE of a precoding matrix that is applied to another UE functioning as interference. Thus, each UE can obtain a reception filter and can remove or minimize an interference signal by applying the obtained reception filter.

Embodiment 2

Figure 5:
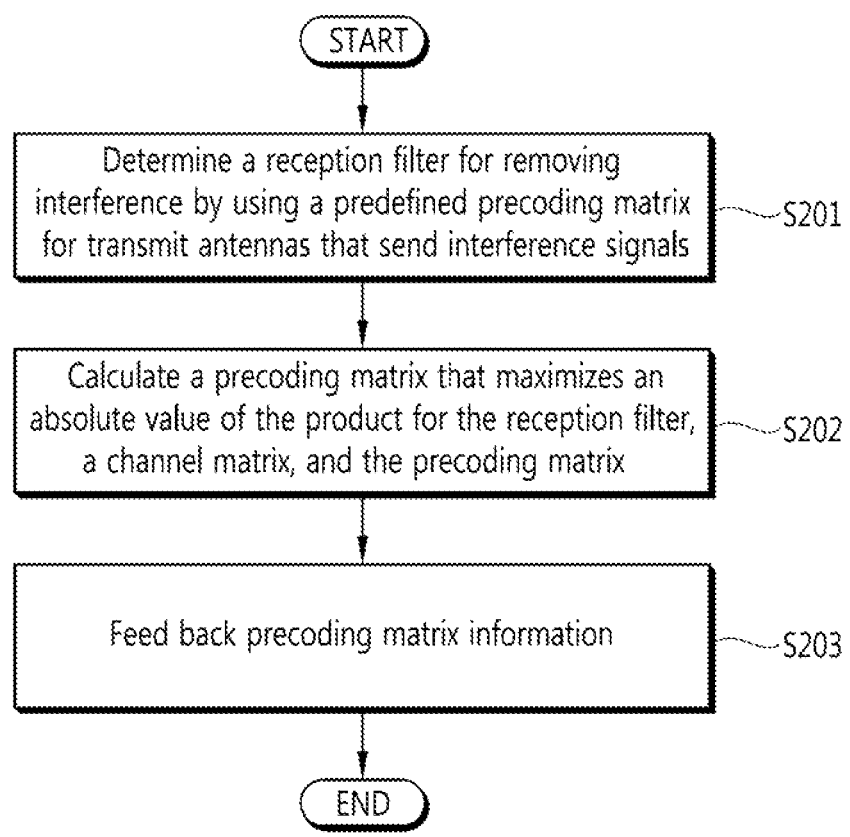
FIG. 5 shows a method of UE removing interference in accordance with another embodiment of the present invention.

FIG. 5 shows a method of UE removing interference in accordance with another embodiment of the present invention.

Referring to FIG. 5, the UE determines a reception filter for removing interference by using a predefined precoding matrix for transmit antennas that send interference signals (S201).

A BS can use a predefined precoding matrix/vector for transmit antennas that generate interference signals, from among the transmit antennas that send the signals to the UE. For example, the BS can multiplex signals for UE 1 and UE 2, respectively, within the same radio resource region through $N^{Tx1\_INT}$ transmit antennas, from among a total of $N^{Tx1}$ transmit antennas that send signals to the UE 1, and sends the multiplexed signal. In this case, the signals transmitted to the UE 2 through the $N^{Tx1\_INT}$ transmit antennas generate interference to the UE 1.

If a precoding matrix W applied to the signals transmitted to the UE 1 is the same as Equation 2 and a precoding matrix V applied to the signals transmitted to the UE 2 is the same as Equation 4, a predefined matrix/vector is used as the precoding matrix/vector $[v_1 \, v_2 \ldots v_N Tx1\_INT]^T$ that is applied to the signals for the UE 2 in the $N^{Tx1\_INT}$ transmit antennas.

Likewise, signals for the UE 1 and the UE 2, respectively, can be multiplexed within the same radio resource region through $N^{Tx2\_INT}$ transmit antennas, from among a total of $N^{Tx2}$ transmit antennas through which signals are transmitted to the UE 2, and can be then transmitted. In this case, the signals transmitted to the UE 1 through the $N^{Tx2\_INT}$ transmit antennas generate interference to the UE 2. Here, the BS uses a predefined matrix/vector as a precoding matrix/vector $[w_1 \, w_2 \ldots w_N Tz2\_INT]^T$ that is applied to the signals for the UE 1 in the $N^{Tx2\_INT}$ transmit antennas.

As described above, if the BS applies the predefined precoding matrix/vector to transmit antennas that send interference signals, the UE 1 and/or the UE 2 can previously know a precoding matrix/vector applied to the transmit antennas that send the interference signals. Accordingly, the UE 1 and/or the UE 2 can find a reception filter that minimizes interference in accordance with Equation 6 and Equation 8.

The UE calculates a precoding matrix that maximizes an absolute value of the product of the reception filter, the channel matrix, and the precoding matrix on the basis of the reception filter (S202).

For example, the UE 1 the precoding matrix/vector W that maximizes $|C_1 H W|$. Likewise, the UE 2 calculates the precoding matrix/vector V that maximizes $|C_2 G V|$. Here, W is calculated within the limits in which $[w_1 \, w_2 \ldots w_N Tx2\_INT]^T$ has a predefined and fixed value, and V is calculated within the limits in which $[v_1 \, v_2 \ldots v_N Tx2\_INT]^T$ has a predefined and fixed value.

The UE feeds precoding matrix information back to the BS (S203).

Embodiment 3

In Embodiment 1, a BS has to signal information on precoding matrices. In Embodiment 2, a precoding row vector applied to transmit antennas that send interference signals has to be limited in a precoding matrix. As a result, there may be limits to the precoding matrices W and V.

In order to solve this problem, UE can find a reception filter satisfying the following equation irrespective of a precoding matrix applied by a BS.

$$A = C_1 [h_1 \ldots h_{N^{Tx1}}\_INT] = 0 \text{ or } \min|A| \quad \text{[Equation 9]}$$

$$B = C_2 [g_1 \ldots g_{N^{Tx2}}\_INT] = 0 \text{ or } \min|B| \quad \text{[Equation 10]}$$

In accordance with Equations 9 and 10, since the reception filters $C_1$ and $C_2$ are not related to precoding matrices applied by a BS, each UE can calculate a reception filter although the UE does not receive information on the precoding matrix.

The UE 1 calculates the precoding matrix/vector W that maximizes $|C_1 HW|$ on the basis of this reception filter. Likewise, the UE 2 calculates the precoding matrix/vector V that maximizes $|C_2 GV|$ on the basis of this reception filter. The UEs 1 and 2 can feed the calculated precoding matrices/vectors W and V back to the BS.

In accordance with a rank nullity-theorem, however, '(the number of ranks of A)+(the number of null spaces of A)=M' is satisfied for a matrix A having an N×M size. Accordingly, if M is greater than the number of ranks of A, x that satisfies Ax=0, that is, a null space is present. In accordance with this rank nullity-theorem, in order for a $C_1$ value satisfying Equation 9 to be present, a condition that a null space of $N^{Rx1} - N^{Tx1\_INT}$ is necessary is required. This condition is equivalent to the following equation.

$$N^{Rx1} > N^{Tx1\_INT} \quad \text{[Equation 11]}$$

That is, the number of receive antennas of the UE 1 has to be greater than the number of transmit antennas that exerts interference on the UE 1. Likewise, the UE 2 has to include the number of receive antennas that satisfies the following equation.

$$N^{Rx2} > N^{Tx2\_INT} \quad \text{[Equation 12]}$$

For example, if the number of receive antennas of UE is 4, the number of transmit antennas that exerts interference has to be 3 or less. If the number of receive antennas of UE is 2, Equation 11 and Equation 12 are satisfied when the number of transmit antennas is 1 or less.

Accordingly, if each UE satisfies conditions, such as Equation 11 and Equation 12, the UE can find its own reception filter for removing interference using Equation 9 or Equation 10 without additional signaling informing a precoding matrix.

However, there may be a case where some of a plurality of UEs does not satisfy the conditions, such as Equation 11 and Equation 12. For example, UE 1 satisfies conditions, such as Equations 11 and 12, but UE 2 may not satisfy the conditions. In this case, the UE 1 having the number of receive antennas greater than the number of transmit antennas that exerts interference can find its own reception filter and a proper precoding matrix W in accordance with Equation 9 (or Equation 10). Next, the UE 1 can feed the precoding matrix W back to a BS. The BS sends information on the feedback precoding matrix W to the UE 2. When information on the feedback precoding matrix W is signaled by the BS, the UE 2 can know the precoding matrix W applied to a signal transmitted from the BS to the UE 1, more particularly, $[w_1 \; w_2 \ldots w_N Tx2\_INT]^T$ and thus can find its own reception filter $C_2$ according to Equation 8.

That is, when there are two UEs which exert interference on each other, if one of the UEs has the number of receive antennas greater than the number of transmit antennas that exert interference, the other UE can minimize interference although it has the number of receive antennas smaller than the number of transmit antennas that exerts interference.

Figure 6:
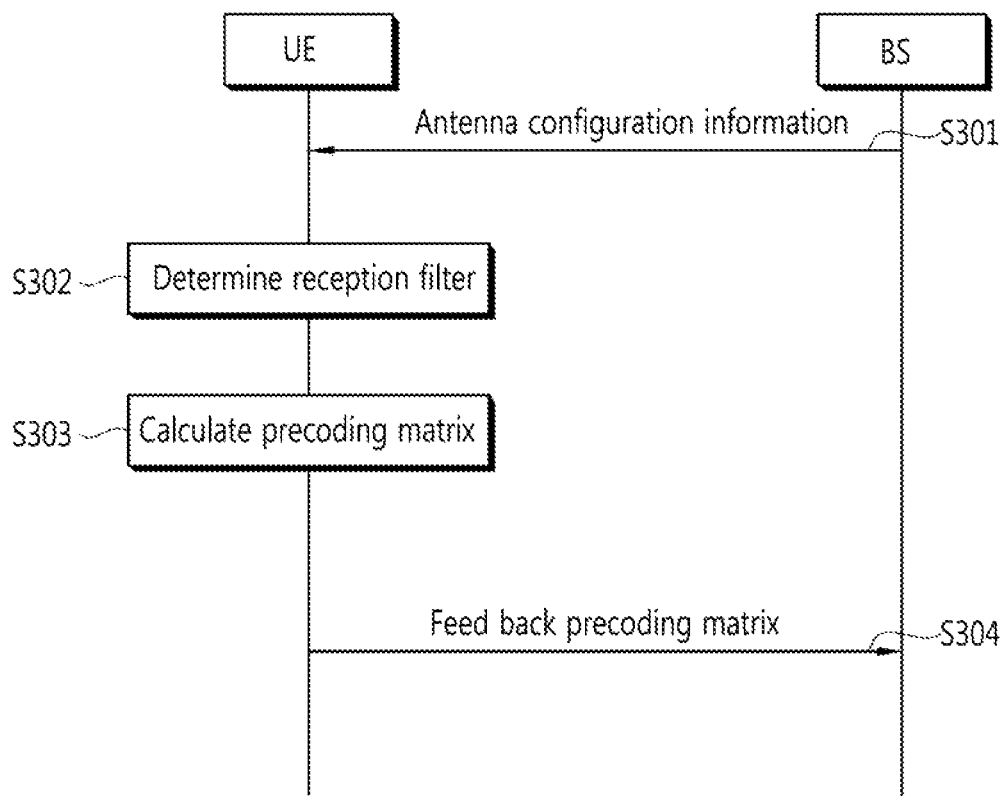
FIG. 6 shows a method of UE removing interference in accordance with yet another embodiment of the present invention.

FIG. 6 shows a method of UE removing interference in accordance with yet another embodiment of the present invention.

A BS can reduce the number of transmit antennas that exert interference if the number of receive antennas of UE does not satisfy the condition of Equation 11 or Equation 12. That is, 1) the BS may not allow a transmit antenna that exerts interference to send an interference signal using a specific resource region, or 2) a transmit antenna that exerts interference may not send any signal. The specific resource region may be a resource region in which UE affected by interference receives its own signal. In this case, it is said that a corresponding transmit antenna is set in an off state.

If a BS sets a specific transmit antenna in the off state, the BS can inform UE of antenna configuration information (S301). The antenna configuration information can include the index, frequency band, frame, etc. of an antenna that does not send an interference signal. If each transmit antenna is identified by a different reference signal, the index of the antenna can be provided in the form of the index of a reference signal.

For example, if some of the antennas of a femto BS are set in an off state in some frequency bands and time, UE can be informed of antenna configuration information related to the some antennas. The antenna configuration information may be broadcast or may be unicast to specific UE. Or, the antenna configuration information may be multicast to a plurality of UEs.

The UE can recognize an antenna that sends (or does not send) an interference signal using the antenna configuration information received from the BS. The UE determines a reception filter (S301). The UE can determine the reception filter in accordance with Equation 9 or Equation 10.

The UE calculates a precoding matrix based on the determined reception filter (S303) and feeds precoding matrix information back to the BS (S304).

In the embodiment, a case where a BS provides UE with antenna configuration information has been described, but other modified examples are possible.

For example, each femto BS can change and apply the number of transmit antennas that broadcast signals to UE. Here, the femto BS may inform UE of the number of transmit antennas that sends broadcast signals through $N^{Tx}$, that is, a system parameter. That is, the femto BS may inform UE of the number of transmit antennas through the broadcast system parameter not a signal that is unicast to specific UE.

Figure 7:
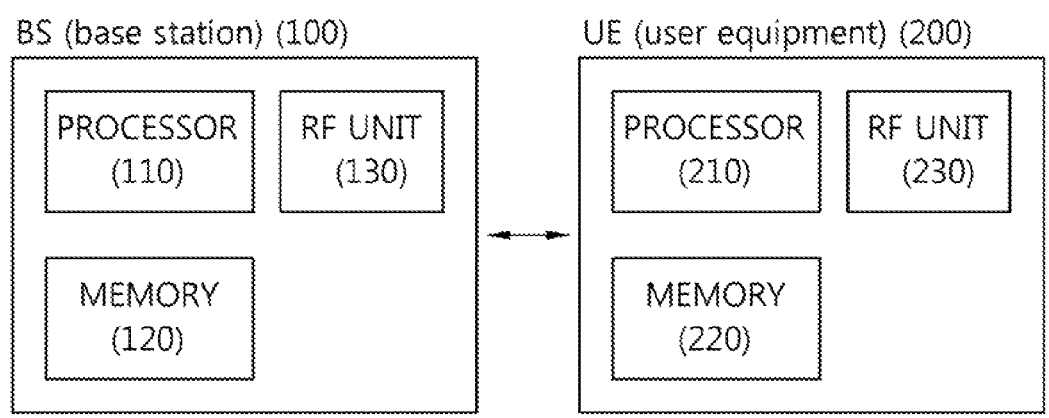
FIG. 7 is a block diagram showing an eNB and UE.

FIG. 7 is a block diagram showing a BS and UE.

The BS 100 includes a processor 110, memory 120, and a Radio Frequency (RF) unit 130. The processor 110 implements the proposed functions, processes and/or methods. That is, the processor 110 sends a precoding matrix applied to a node or a transmit antenna that sends a signal, functioning as interference, to UE Or, the processor 110 sends antenna configuration information which indicates transmit antennas and performs a configuration so that the number of receive antennas of UE is greater than the number of transmit antennas that sends signals, functioning as interference, to the UE. The antenna configuration information can include the index, corresponding frequency band, corresponding time domain, for example, frame information, etc. of an antenna that is set in an off state so that the antenna does not send an interference signal to the UE. Furthermore, the processor 110 can perform scheduling based on feedback information transmitted by UE, for example, information on a precoding matrix preferred by the UE. The memory 120 is connected with the processor 110, and it stores various pieces of information for driving the processor 110. The RF unit 130 is connected with the processor 110, and it transmits and/or receives radio signals. The RF unit 130 can be formed of a plurality of nodes connected to the BS 100 by a wire.

The UE 200 includes a processor 210, memory 220, and an RF unit 230. The processor 210 receives information on a precoding matrix, applied to an interference signal, from a BS and removes an interference signal included in a signal transmitted to the UE 200.

If the precoding matrix applied to the interference signal is fixed and the fixed precoding matrix is known to the processor 210, an interference signal can be removed using the fixed precoding matrix. Furthermore, the processor 210 can receive antenna configuration information. If the number of transmit antennas that sends signals functioning as interference is known to be smaller than the number of receive antennas based on the antenna configuration information, the processor 210 can apply a matrix in which an absolute value is a minimum when multiplying the matrix by a channel matrix between the UE and a BS, as described in Equation 9 or Equation 10, as a reception filter. The processor 210 can obtain a preferred precoding matrix and feed the preferred precoding matrix back to the BS.

The memory 220 is connected with the processor 210, and it stores various pieces of information for driving the processor 210. The RF unit 230 is connected with the processor 210, and it transmits and/or receives radio signals.

The processor 110, 210 can include Application-Specific Integrated Circuits (ASICs), other chipsets, logic circuits, data processor and/or converters for mutually converting baseband signals and radio signals. The memory 120, 220 can include Read-Only Memory (ROM), Random Access Memory (RAM), flash memory, memory cards, storage media and/or other storage devices. The RF unit 130, 230 can include one or more antennas for transmitting and/or receiving radio signals. When the above-described embodiment is implemented in software, the above-described scheme can be implemented into a module (process, function, etc.) that performs the above function. The module can be stored in the memory 120, 220 and executed by the processor 110, 210. The memory 120, 220 can be placed inside or outside the processor 110, 210 and can be connected to the processor 110, 210 using a variety of well-known means.

The present invention may be implemented using hardware, software, or a combination of them. In hardware implementations, the present invention may be implemented using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be implemented into a module that performs the above function. The software may be stored in a memory unit and executed by the processor. The memory unit or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

The invention claimed is:

1. A method of removing interference, the method performed by first User Equipment (UE) in a multi-node system and comprising:
   receiving information from a node, the information related to a second precoding matrix applied to a second signal transmitted to a second UE;
   receiving a first signal to which a first precoding matrix has been applied from the node; and
   removing an interference signal included in the first signal based on the information related to the second precoding matrix,
   wherein the interference signal is a product of the second signal and a channel matrix between the node and the first UE,
   wherein the information related to the second precoding matrix comprises a precoding row vector in the second precoding matrix for a transmit antenna that exerts interference on the first UE.

2. A method of removing interference, the method performed by first User Equipment (UE) in a multi-node system and comprising:
   receiving a first signal to which a first precoding matrix has been applied from a node;
   obtaining a precoding matrix that maximizes the first signal based on a reception filter and a channel matrix between the node and the first UE;
   removing an interference signal included in the first signal, the interference signal comprising a second signal for a second UE to which a second precoding matrix has been applied; and
   feeding the precoding matrix that maximizes the first signal back to the node,
   wherein a precoding row vector in the second precoding matrix for a transmit antenna of the node that sends a signal and exerts interference on the first UE includes a predefined fixed value, and
   wherein the first UE uses precoding row vectors including the predefined fixed value to obtain a reception filter that minimizes the interference signal.

3. A method of removing interference, the method performed by first User Equipment (UE) in a multi-node system and comprising:
   receiving antenna configuration information from a Base Station (BS);
   receiving a first signal from at least one node controlled by the BS;
   obtaining a precoding matrix that maximizes the first signal, the precoding matrix obtained based on a reception filter and a channel matrix between the at least one node and the first UE;
   removing an interference signal from the first signal; and
   feeding the precoding matrix that maximizes the first signal back to the BS,
   wherein the interference signal comprises a second signal to which a second precoding matrix is applied, the second signal transmitted from the at least one node to a second UE, and
   wherein the antenna configuration information comprises information indicating transmit antennas configured such that a number of receive antennas of the first UE is greater than a number of transmit antennas that send signals exerting interference on the first UE.

4. The method of claim 3, wherein the antenna configuration information further comprises information from among the transmit antennas that send signals exerting interference on the first UE, the information related to an antenna index, frequency band, or time for a transmit antenna that does not send a signal.

5. The method of claim 3, wherein the antenna configuration information is broadcast.

6. A User equipment, comprising:
- a Radio Frequency (RF) unit configured for transmitting and receiving radio signals; and
- a processor connected to the RF unit and configured for:
- receiving antenna configuration information from a Base Station (BS);
- receiving a first signal from at least one node controlled by the BS;
- obtaining a precoding matrix that maximizes the first signal, the precoding matrix obtained based on a reception filter and a channel matrix between the at least one node and the first UE;
- removing an interference signal from the first signal; and
- feeding the precoding matrix that maximizes the first signal back to the BS, wherein the interference signal comprises a second signal to which a second precoding matrix is applied, the second signal transmitted from the at least one node to a second UE, wherein the antenna configuration information comprises information indicating transmit antennas configured such that a number of receive antennas of the first UE is greater than a number of transmit antennas that send signals exerting interference on the first UE, wherein removing the interference signal comprises applying a matrix as the reception filter for the first signal, and wherein an absolute value of the applied matrix is a minimum when multiplying the matrix by the channel matrix between the at least one node and the first UE.

* * * * *